United States Patent [19]

Heller et al.

[11] Patent Number: 5,760,995
[45] Date of Patent: Jun. 2, 1998

[54] MULTI-DRIVE, MULTI-MAGAZINE MASS STORAGE AND RETRIEVAL UNIT FOR TAPE CARTRIDGES

[75] Inventors: Kenneth L. Heller, Worcester; George A. Saliba, Northboro; Michael J. Kearnan, Milford, all of Mass.

[73] Assignee: Quantum Corporation, Milpitas, Calif.

[21] Appl. No.: 710,033

[22] Filed: Sep. 11, 1996

Related U.S. Application Data

[60] Provisional application No. 60/008,028 Oct. 27, 1995.

[51] Int. Cl.[6] .......................... G11B 15/68; G11B 17/22
[52] U.S. Cl. ........................ 360/92; 360/98.04; 369/35
[58] Field of Search ........................ 360/92, 94, 98.04; 369/34–39

[56] References Cited

U.S. PATENT DOCUMENTS

| | | | |
|---|---|---|---|
| 4,772,968 | 9/1988 | Nonaka et al. | 360/92 |
| 4,932,826 | 6/1990 | Moy et al. | 360/92 |
| 4,937,690 | 6/1990 | Yamashita et al. | 360/92 |
| 5,056,073 | 10/1991 | Fitzgerald et al. | 369/36 |
| 5,274,516 | 12/1993 | Kakuta et al. | 360/92 |
| 5,277,534 | 1/1994 | Anderson et al. | 360/92 |
| 5,285,333 | 2/1994 | Barr et al. | 360/92 |
| 5,323,327 | 6/1994 | Carmichael et al. | 360/92 |
| 5,353,179 | 10/1994 | Elliot et al. | 360/92 |
| 5,532,931 | 7/1996 | Erickson, Jr. et al. | 360/92 |
| 5,537,268 | 7/1996 | Felde et al. | 360/92 |
| 5,610,882 | 3/1997 | Dang | 369/36 |

*Primary Examiner*—Jefferson Evans
*Attorney, Agent, or Firm*—David B. Harrison; Debra A. Chun; Nydegger & Associates

[57] ABSTRACT

A multi-drive, multi-magazine mass storage and retrieval unit for tape cartridges which automatically retrieves a selected one of a plurality of tape cartridges from one of a plurality of tape cartridge magazines for transfer to a selected one of a plurality of tape drives. The unit further retrieves a selected one of a plurality of tape cartridges from one of the plurality of tape drives for storage in one of the plurality of tape cartridge magazines. A tape cartridge elevator retrieves and transports the tape cartridges between the plurality of tape cartridge magazines and the plurality of tape drives. An interunit cartridge transport unit enables multiple tape storage and retrieval units to be coupled together and cartridges to be passed automatically between the coupled units.

24 Claims, 9 Drawing Sheets

MULTI-DRIVE, MULTI-MAGAZINE MASS STORAGE AND RETRIEVAL UNIT FOR TAPE CARTRIDGES

REFERENCE TO RELATED APPLICATION

This claims the benefit of U.S. Provisional Application No. 60/008,028, filed on Oct. 27, 1995.

FIELD OF THE INVENTION

The present invention relates generally to a method and apparatus for the storage, retrieval and loading of units of data storage media and, more particularly, to a method and apparatus for the storage, retrieval, and loading of cartridges of data storage media, such as magnetic tape.

BACKGROUND OF THE INVENTION

Automated tape libraries were developed to expedite the selection and loading of magnetic tape reels. One such type of automated tape library resembles an elongate rectangular chamber. Racks of tape reels are provided at selected locations along the interiors of the opposing elongated walls. An interior track runs the length of the chamber between the parallel racks. A reel retrieval/loading device is mounted on a carriage that travels along the track, and is translatable along two rectangular axes in addition to the third axis of the track. The retrieval/loading device is automatically controlled to locate and engage a selected reel in a Cartesian coordinate system, and then transports the selected reel to a target one of a plurality of tape drives. The tape drives are located along the exterior wall of the chamber at windows provided for access to the drives. The retrieval/loading device automatically mounts the selected reel on the target tape drive.

Another configuration for a storage library features a cylindrical chamber, with racks provided along the interior of the circular wall and a plurality of peripheral devices located along the exterior at windows. The retrieval/loading device is positioned in the center of the room and is operated in a cylindrical coordinate fashion.

Magnetic tape cartridges have recently become popular as a unit of storage medium, particularly 8 mm magnetic tape cartridges. Advantageously, magnetic tape cartridges facilitate economic and compact storage of data. With the advent of widespread use of magnetic tape cartridges, the need to provide automatic storage and retrieval systems for such tape cartridges has resulted in a wide range of automated storage and retrieval systems. These storage and retrieval systems suffer from drawbacks such as limited cartridge capacity and also lack of ability to be expanded.

The present invention is directed to reducing the effects of one or more of the problems set forth above. In particular, the present invention provides a mass storage unit for tape cartridges which controllably loads a selected one of a plurality of tape cartridges to and from one of a plurality of magazines into and out of a selected one of a plurality of tape drives by use of a tape cartridge elevator.

SUMMARY OF THE INVENTION

In one aspect of the present invention a mass storage and retrieval unit includes a plurality of tape drive slots, a plurality of tape cartridge magazine slots, a tape cartridge elevator disposed between the tape drive slots and the tape cartridge magazine slots, and means for moving the elevator. In this aspect, the multi-drive, multi-magazine cartridge handling unit includes a housing having one side wall adapted for receiving the plurality of tape cartridge magazines, and having another side wall adapted for receiving the plurality of tape drives; an elevator which is linearly moveable over at least one guide shaft between positions associated with each magazine tape-cartridge slot and each drive tape-cartridge slot and having a roller assembly, an elevator tape-cartridge slot, and a cartridge movement mechanism associated with the roller assembly for engaging the specified cartridge, for moving the specified cartridge between the magazine tape-cartridge slot and the drive tape-cartridge slot via the elevator tape-cartridge slot; and an elevator control for controlling movement of the elevator between the magazine tape-cartridge slot and the drive tape cartridge-slot in accordance with data requests received from a computer.

In another aspect of the present invention a tape cartridge elevator includes a tape cartridge slot and at least one roller assembly within the tape cartridge slot for imparting motion to move a tape cartridge. In this aspect of the invention the tape cartridge elevator mechanism may include a substantially rectangular elevator housing having an upper end, a lower end, and a plurality of sides including a left side and a right side that together define an elevator tape-cartridge slot, and a roller drive shaft opening in one of the sides; at least one roller assembly attached to the elevator housing at the upper end of the elevator tape-cartridge slot; a driver gear attached to the elevator housing and having an opening aligned with the roller-drive-shaft opening for receiving a roller drive shaft and being coupled to roller gears via at least one idler gear; and, at least one leaf spring extending from a side of the housing into the elevator tape-cartridge slot; a release finger extendible into a magazine tape cartridge slot; a rack drive opening to receive a rack drive shaft; and a rack mechanism attached to the elevator housing and having an opening aligned with the rack-drive-shaft opening for receiving the rack drive shaft and being coupled to the at least one roller assembly.

Another aspect of the present invention involves a method of automatically loading or unloading a selected one of a plurality of tape cartridges to or from one of a plurality of magazines into or out of one of a plurality of tape drives in response to a request from a computer. In this aspect of the invention the automatic loading method may comprise the steps of:

positioning the elevator at the magazine tape cartridge slot containing the specified tape cartridge and thereupon engaging a release lever for the tape cartridge slot with a release finger, bringing an elevator roller assembly into contact with the specified tape cartridge;

operating the roller assembly to move the specified tape cartridge into the elevator tape-cartridge slot;

repositioning the elevator at a drive tape-cartridge slot of a selected tape drive;

operating the roller assembly to move the specified tape cartridge into the drive tape-cartridge slot of the selected drive to load the specified tape cartridge into an operating position; and signaling the computer that the specified tape cartridge has been loaded into the operating position of the selected tape drive within the multi-drive, multi-magazine cartridge handling unit.

As a further related aspect, this method may be practiced in reverse in order to return a cartridge from the selected tape drive to its proper slot in the magazine.

In another aspect of the present invention, interunit transfer devices may be installed in two adjacently facing storage and retrieval units in order to facilitate automatic transfer of tape cartridges between the two units. In this aspect of the invention, a mass storage and retrieval subsystem comprises at least a first and a second multi-drive, multi-magazine mass storage and retrieval units. Each storage and retrieval unit includes a housing having a front, a rear, a left side, a right side, a top and a bottom; a plurality of tape-drive slots arranged at the rear of the housing; a plurality of tape-cartridge magazine slots arranged at the front of the housing; an elevator disposed within the housing between the tape-drive slots and the tape-cartridge magazine slots and positionally guided by at least one guide shaft extending between the left wall and the right wall of the housing; and, an elevator displacement mechanism for controllably displacing the elevator along the guide shaft between selected ones of the tape-drive slots and the tape cartridge magazine slots. This aspect further includes a first and a second interunit cartridge transport wherein the first interunit cartridge transport may be located at a tape-drive slot adjacent the rear and one of the sides of the first multi-drive, multi-magazine mass storage and retrieval units, and the second interunit cartridge transport may be located at a tape-drive slot adjacent the rear and an opposite one of said sides of the second multi-drive, multi-magazine mass storage and retrieval units. Each interunit cartridge transport includes a substantially rectangular interunit housing; a front tape cartridge slot positioned along the front face of the interunit housing and aligned with the tape-drive slot, a side tape cartridge slot positioned along a side face of the interunit housing; and a tape cartridge transport mechanism within the interunit housing connected to the front cartridge slot and the side tape cartridge slot. In this aspect of the invention, the first and a second multi-drive, multi-magazine mass storage and retrieval units are adjacently located and define aligned openings, such that tape cartridges may be passed between the first and second interunit cartridge transports by the interunit cartridge transports and through aligned openings of the first and second mass storage and retrieval units.

BRIEF DESCRIPTION OF THE DRAWINGS

The present invention will become more fully understood from the following detailed description of the preferred embodiments, taken in conjunction with the accompanying drawings in which.

DETAILED DESCRIPTION OF PREFERRED EMBODIMENTS

One embodiment of the invention provides a multi-drive, multi-magazine mass storage and retrieval unit for tape cartridges which controllably loads or unloads a selected one of a plurality of tape cartridges from or into one of a plurality of magazines into or out of a selected one of a plurality of tape drives by use of a tape cartridge elevator.

Figure 1:
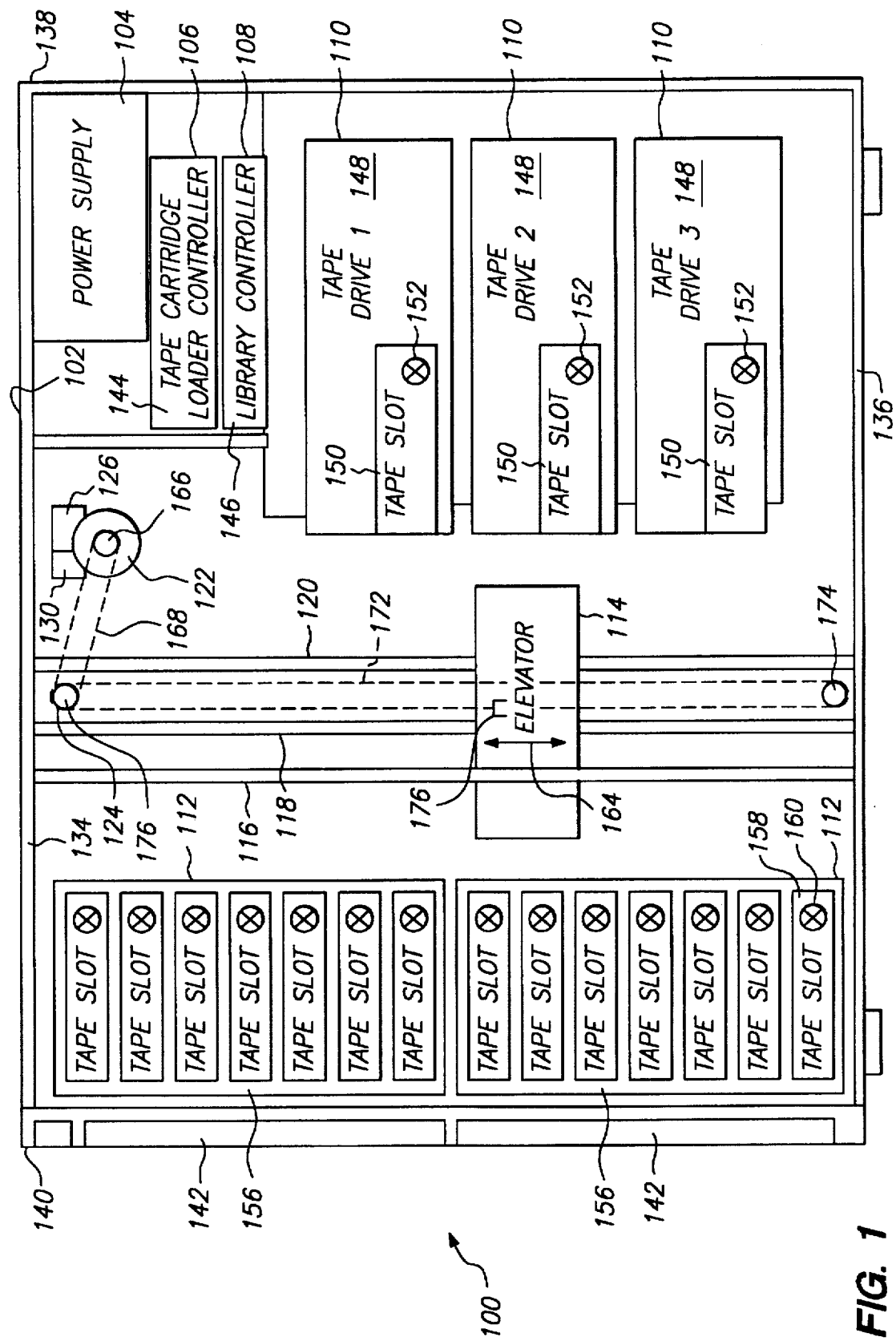
FIG. 1 is a top view illustrating a preferred embodiment of a mass storage and unit for tape cartridges.

FIG. 1 shows a top view of a multi-drive, multi-magazine mass storage and retrieval unit 100 for tape cartridges. The mass storage and retrieval unit 100 includes a housing 102, a power supply 104, a tape cartridge loader controller slot 106, a library controller slot 108, a plurality of tape drive slots 110, a plurality of tape cartridge magazine slots 112, a tape cartridge elevator 114, at least one tape cartridge elevator guide shaft 116, a roller drive shaft 118, a rack drive shaft 120, a tape cartridge elevator motor 122, a pulley drive assembly 124, a roller drive shaft motor 126, a roller drive shaft coupling assembly 128, a rack drive shaft motor 130, and a rack drive shaft coupling assembly 132, structural elements 126, 128, 130 and 132 being shown in greater detail in FIG. 3C.

The housing 102 may be substantially rectangular or square in cross section and includes a left side wall 134, a right side wall 136, a rear wall 138, and a front panel 140. The front panel 140 includes a plurality of access doors 142 pivotally mounted onto the front 140 opposite the tape cartridge magazine slots 112 that permit manual loading and unloading of tape cartridges by an operator into the tape cartridge magazines within the mass storage and retrieval unit 100. The housing 102 may be constructed of any number of conventional materials such as, for example, those utilized in industry standard rack mount cabinets.

The power supply 104 may be positioned in a rear corner of the housing 102 adjacent to the tape cartridge loader controller slot 106 and library controller slot 108. The power supply 104 provides electrical power in a well known manner to the tape cartridge loader controller slot 106, library controller slot 108, the plurality of tape drive slots 110, tape cartridge elevator motor 122, roller drive shaft motor 126, and rack drive shaft motor 130. The power supply 104 is interfaced with these components as well as with an external power source in a well known manner using industry standard cabling and connections.

The tape cartridge loader controller slot 106 receives a tape cartridge loader controller 144 while the library controller slot 108 receives a library controller 146. The tape cartridge loader controller 144 and the library controller 146 may comprise any programmable general purpose computer and preferably will comprise a suitably programmed microprocessor or microcontroller. The input-output connections between the tape cartridge loader controller 144, library controller 146 and the other components of the unit 100 may comprise well known industry standard cabling and communication protocols. Alternatively, the tape cartridge loader controller 144 and library controller 146 will comprise a single general purpose computer, microprocessor, or microcontroller. Furthermore, the mass storage and retrieval unit 100 may be operated by means of the cartridge loader controller 144 and library controller 146 for use in conventional data processing, or alternatively for use in a video-on-demand machine.

Figure 2:
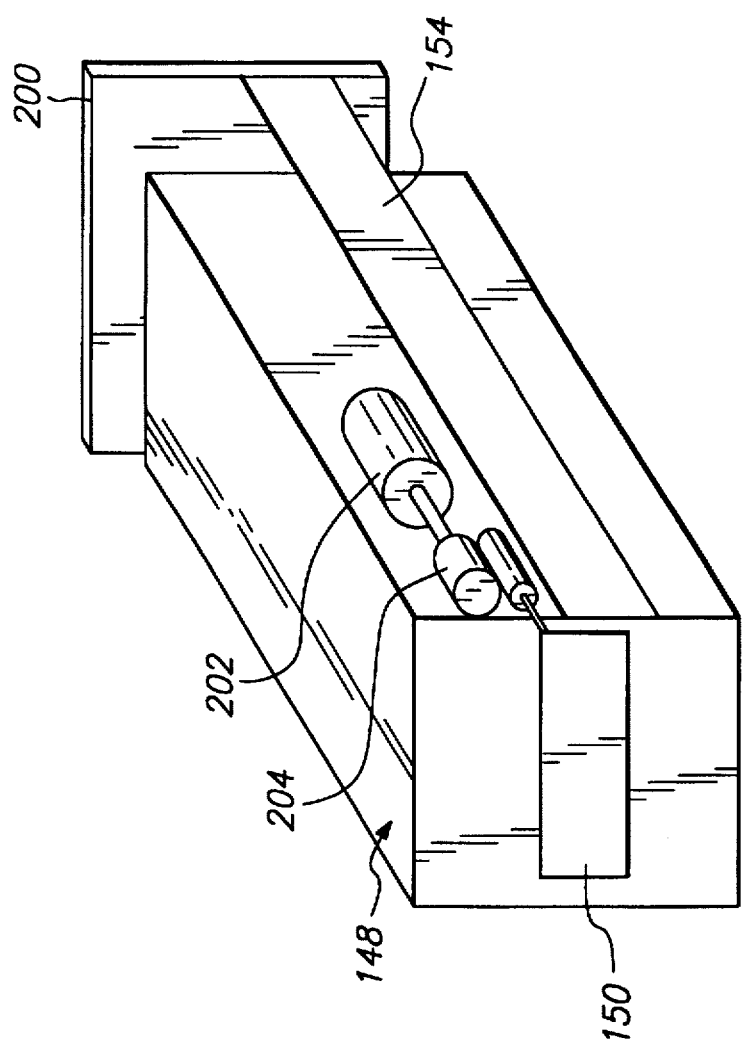
FIG. 2 is an illustration of a standard tape drive modified for use in the mass storage and retrieval unit.

Each of the tape drive slots 110 receives a standard tape drive 148 such as, for example, a Quantum DLT2000XT or DLT4000 adapted to fit into the tape drive slots 110. Referring to FIG. 2, the tape drive 148 includes a tape cartridge slot 150 and a tape cartridge sensor 152 within the slot 150 which generates a tape cartridge presence signal. A standard tape drive 148 may be adapted for use in the mass storage and retrieval unit 100 by removing the handle at the front of the drive 148, removing the bezel from the front of the drive 148, and installing the tape drive 148 onto a conventional mounting bracket 154 that supports the tape drive 148 within the housing 102 and provides adequate alignment of the tape drive 148 relative to the other components of the unit 100. The mounting bracket 154 includes a rear mounting plate 200 for rigid attachment to the housing 102 of the unit 100. The design and fabrication of a suitable mounting bracket 154 would be routine to a person of ordinary skill in the art having the benefit of the present disclosure. The tape drive 148 further includes a handle motor assembly 202 and handle actuator and transmission 204 to provide automatic actuation of the tape drive door under the control of the tape cartridge loader controller 106 and library controller 108. The handle motor assembly 202 may comprise a stepper motor or DC servo motor. The handle actuator and transmission 204 may comprise any conventional transmission for converting rotation of the output shaft of the assembly 202 into rotation and translation of the tape drive door.

Figure 3A:
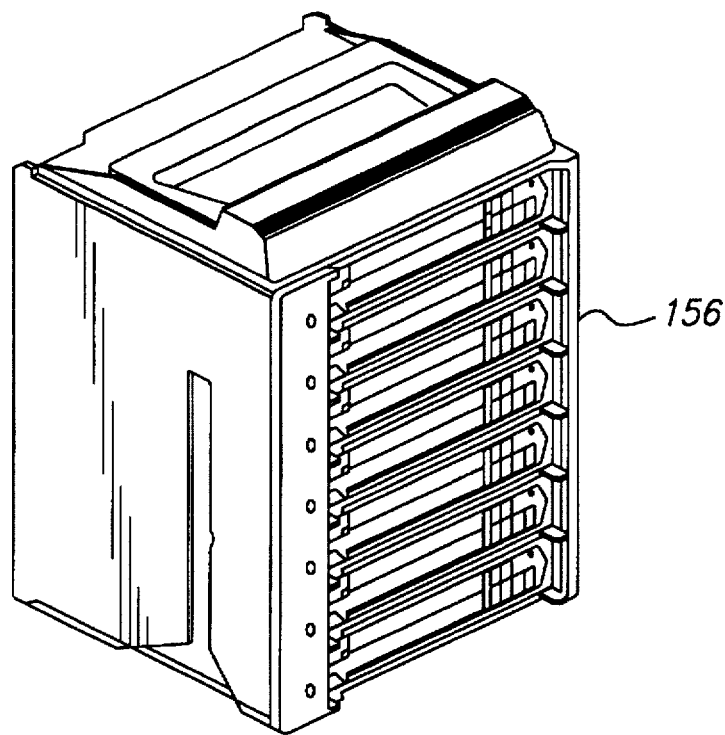
FIGS. 3A and 3B illustrate a standard tape cartridge magazine modified for use in the mass storage and retrieval unit.
Figure 3B:
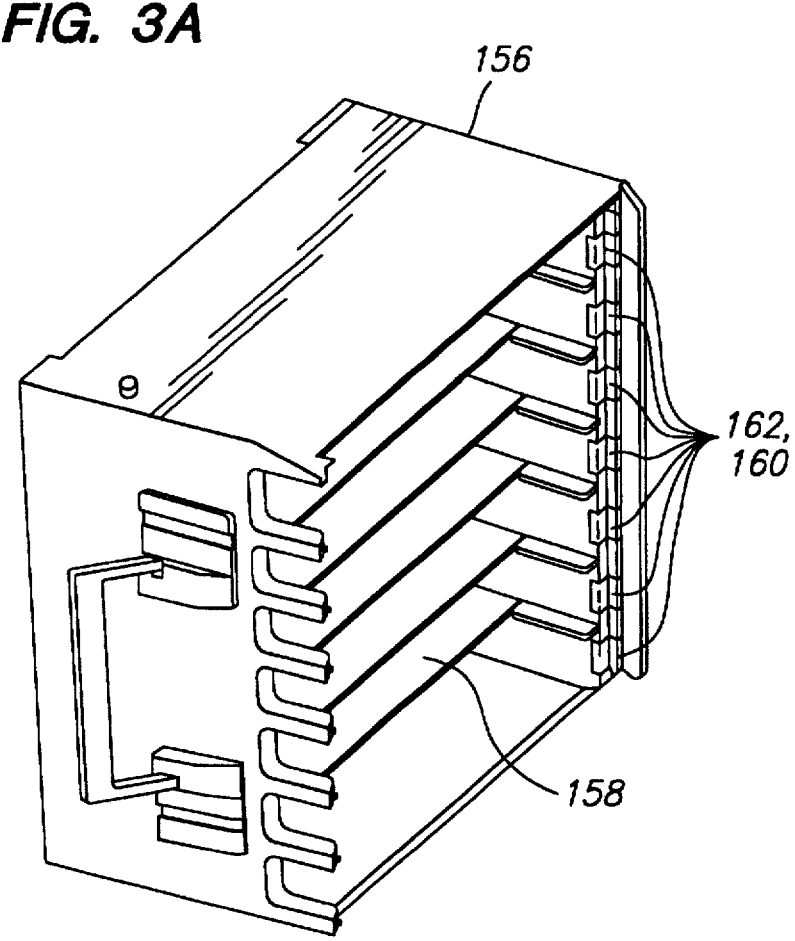

Each of the tape cartridge magazine slots 112 receives a standard tape cartridge magazine 156 such as, for example, a Quantum TK85-M seven cartridge magazine adapted for use in the mass storage and retrieval unit 100. Referring to FIGS. 3A and 3B, the tape cartridge magazine 156 includes one or more tape cartridge slots 158, a tape cartridge presence flag 160 within each slot 158 which provides an indication of the presence or absence of a tape cartridge, and a release lever 162 for each slot 158. A standard tape cartridge magazine 156 may be adapted by removing the handle from the top of the magazine 156, adding a handle to the side, and modifying the lever lock by adding a one-way spring gate to force the guide pin to follow the proper path and thereby prevent incorrect manual operation when the magazine 156 is laid on its side. The modification of the lever lock of such a standard tape cartridge magazine 156 would be routine to a person of ordinary skill in the art having the benefit of the present disclosure.

As shown in FIG. 1 the tape cartridge elevator 114 is positioned within the housing 102 between the plurality of tape drive slots 110 and the plurality of tape cartridge magazine slots 112. In this manner, the tape cartridge elevator 114 is able to load and unload tape cartridges to and from all of the tape drives 148 and tape cartridge magazines 156. The tape cartridge elevator 114 is actuated in the directions indicated by the arrows 164 by the tape cartridge elevator motor 122 and pulley drive assembly 124 under the control of the tape cartridge loader controller 144 and library controller 146. The pulley drive assembly 124 includes a cartridge drive motor pulley 166, a short drive belt 168, an elevator drive pulley 170, a long drive belt 172, and an elevator idler pulley 174. The tape cartridge elevator 114 is slidably mounted upon at least one tape cartridge elevator guide shaft 116 and removably attached to the long drive belt 172 of the pulley drive assembly 124 at a connection point 176. The tape cartridge drive motor pulley 166 is rigidly attached to the output shaft of the tape cartridge drive motor 122. The elevator drive pulley 170 and the elevator idler pulley 174 are rotatably supported by the left and right side walls of the housing 102. The short drive belt 168 is mounted on and between the tape cartridge drive motor pulley 166 and the elevator drive pulley 170 while the long drive belt 172 is mounted one and between the elevator drive pulley 170 and the elevator idler pulley 174.

Under the control of the tape cartridge loader controller 106 and library controller 108, the tape cartridge elevator motor 122 rotates the tape cartridge drive motor pulley 166. Rotation of the tape cartridge drive motor pulley 166 in turn rotates the elevator drive pulley 170. Rotation of the elevator drive pulley 170 in turn causes the long drive belt 172 to move about the elevator drive pulley 170 and the elevator idler pulley 174. As a result of this arrangement, the tape cartridge elevator 114 translates in the direction indicated by the arrows 164 when the tape cartridge elevator motor 122 is rotated under the control of the tape cartridge loader controller 144 and library controller 146 by virtue of the connection 176 with the long drive belt 172.

The tape cartridge elevator motor 122 may comprise any controllably positionable motor such as, for example, a stepper motor, a servo motor, or a DC motor. The pulley drive assembly 124, which converts rotation of the output drive shaft of the tape cartridge elevator motor 122 into translation of the tape cartridge elevator 114, may be replaced with equivalent means such as, for example, a lead screw driven directly by the tape cartridge elevator motor 122 with the tape cartridge elevator 114 including a suitable connection threadably mounted onto the lead screw, or alternatively, the elevator drive pulley 170 may be driven directly from the output shaft of the tape cartridge elevator motor 122 thereby eliminating the need for the short drive belt 168. Other similar alternative means for converting a rotational input into a translational output may also be used in the present embodiment.

Figure 3C:
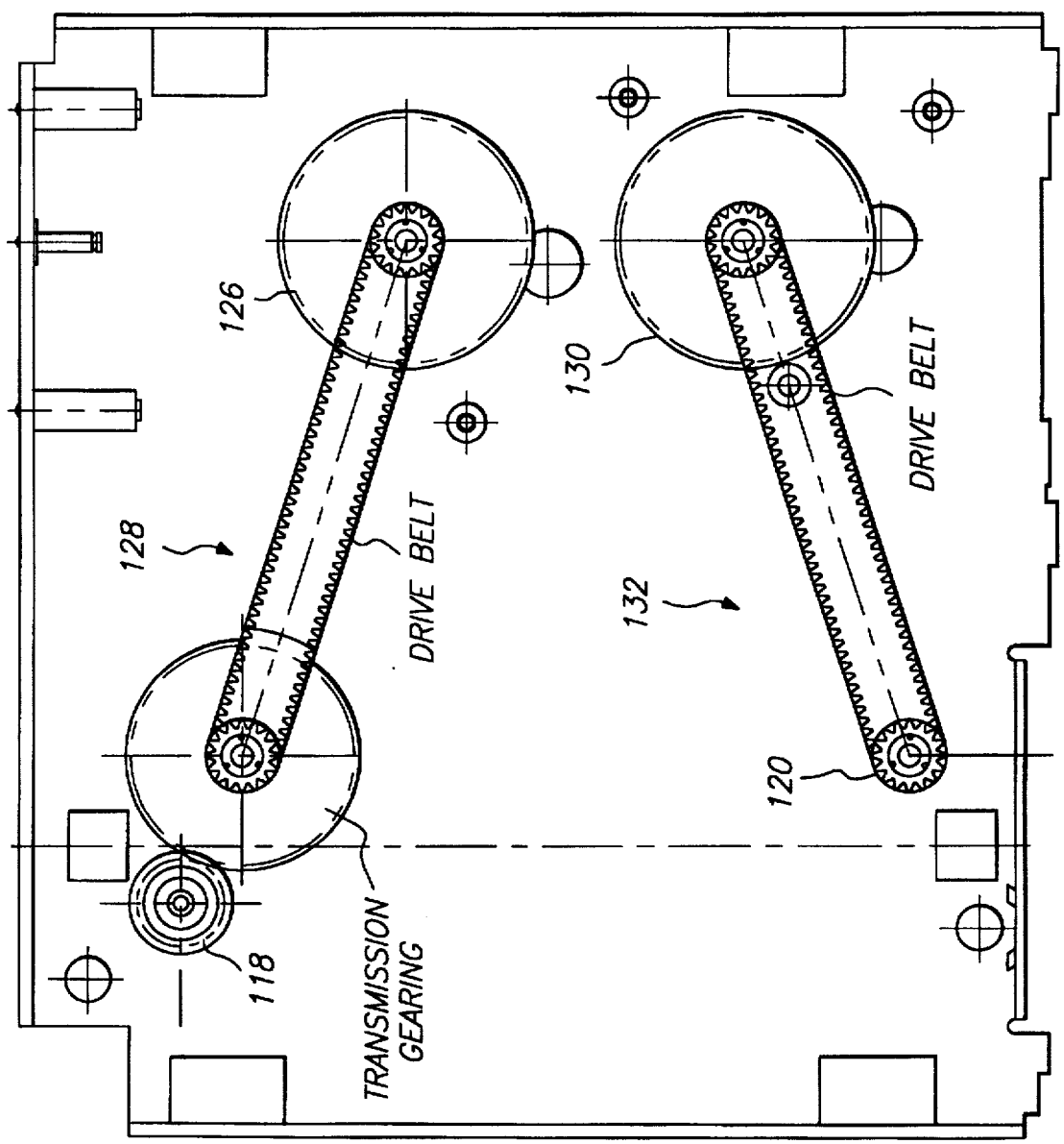
FIG. 3C illustrates the roller drive shaft coupling and the rack drive shaft coupling used in the mass storage and retrieval unit.

The roller drive shaft 118 is rotatably supported at opposite ends by the left side wall 134 and right side wall 136 of the housing 102. The roller drive shaft 118 further passes through and is operably coupled to the tape cartridge elevator 114. The roller drive shaft 118 is rotated by the roller drive shaft motor 126 and roller drive shaft coupling assembly 128 under the control of the tape cartridge loader controller 106 and library controller 108. Referring to FIG. 3C, the roller drive shaft coupling assembly 128 may comprise any conventional transmission for coupling a rotary input to a rotary output which may include belts and pulleys, a gear train, or some combination of both.

The rack drive shaft 120 is rotatably supported at opposite ends by the left side wall 134 and right side wall 136 of the housing 102. The rack drive shaft 118 further passes through, and is operably coupled to, the tape cartridge elevator 114. The rack drive shaft 120 is rotated by the rack drive shaft motor 130 and rack drive shaft coupling assembly 132 under the control of the tape cartridge loader controller 106 and library controller 108. Referring to FIG. 3C, the rack drive shaft coupling assembly 132 may comprise any conventional transmission for coupling a rotary input to a rotary output which may include belts and pulleys, a gear train, or some combination of both.

The roller drive shaft motor 126 and rack drive shaft motor 130 may comprise any controllably positionable electric motor such as, for example, a stepper motor, a servo motor, or a DC motor. In a one embodiment, the roller drive shaft motor 126 and rack drive shaft motor 130 are stepper motors and are further positioned immediately adjacent one another.

Figure 4:
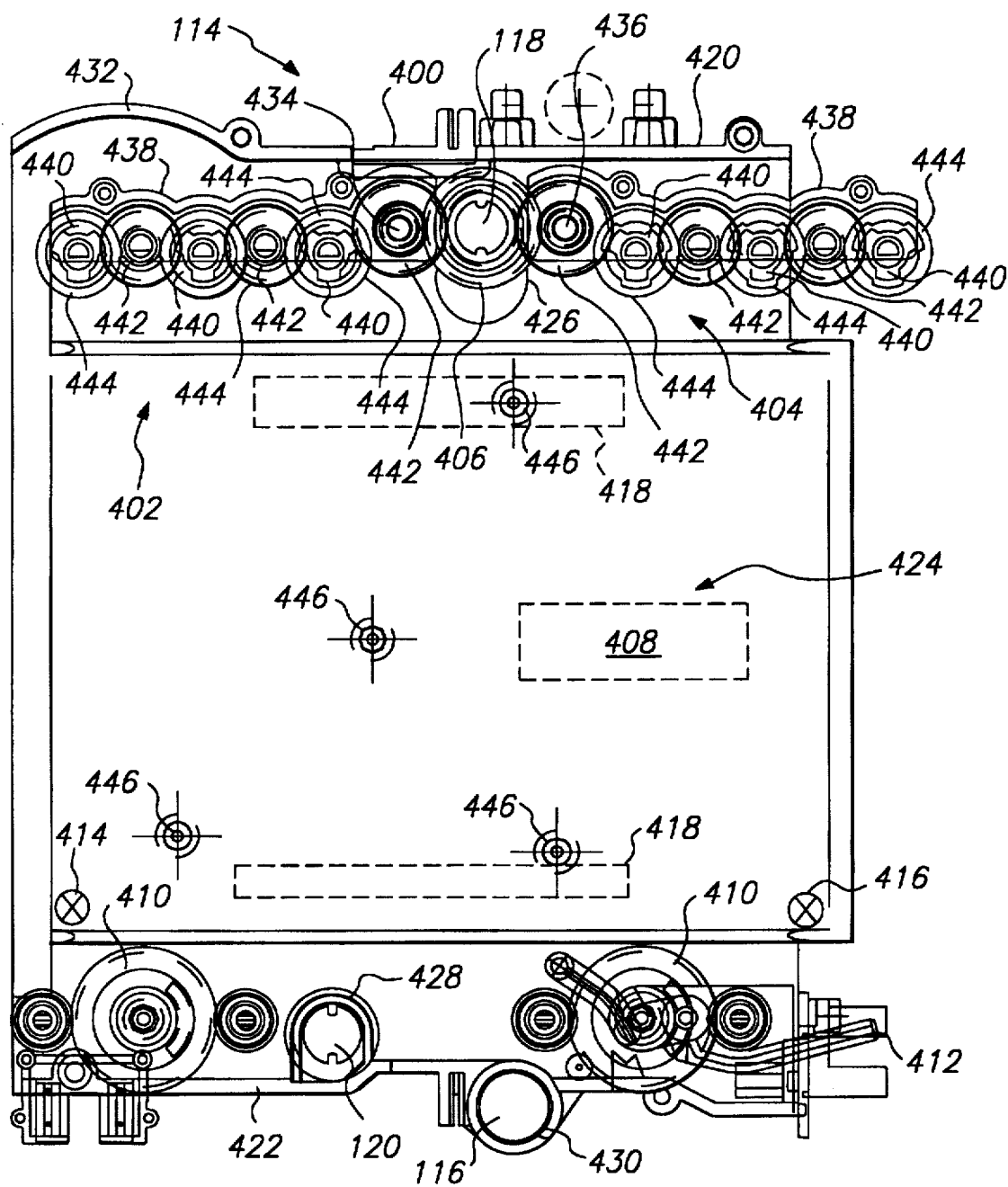
FIG. 4 is a cross sectional view illustrating the tape cartridge elevator of the mass storage and retrieval unit.

FIG. 4 shows a cross sectional view of the tape cartridge elevator 114 used for retrieving and transporting tape cartridges to and from slots in the tape drives 148 and tape cartridges magazines 156. The tape cartridge elevator 114 includes a housing 400, at least one upper rear roller assembly 402, at least one upper front roller assembly 404, at least one driver gear 406, a rack mechanism 408, lower rollers 410, a conventional tape cartridge release finger 412, tape cartridge sensors 414 and 416, and at least one leaf spring 418 (there being two leaf springs 418 shown in FIG. 4).

The housing 400 may be box shaped with a rectangular or square cross sectional shape and includes an upper end 420, a lower end 422, and a plurality of sides including left and a right side that together define a tape cartridge slot 424. The housing 400 further includes a roller drive shaft opening 426 at an upper end of the housing 400 rotatably supporting the roller drive shaft 118. The housing 400 also includes a rack drive shaft opening 428 at a lower end of the housing 400 rotatably supporting the rack drive shaft 120. The housing 400 also further includes at least one elevator guide shaft opening 430 at a lower end of the housing 400 slidably receiving the at least one tape cartridge elevator guide shaft 116.

The housing 400 may be fabricated on three of its sides of a suitable lightweight rigid material such as plastic or aluminum, and preferably is fabricated from one piece of material for ease of manufacturing. The fourth side of the housing 400 may be fabricated of a rigid material such as, for example, stainless steel or aluminum, or alternately from a suitably strong and rigid plastic. The fourth side may then be joined to the first three sides via mechanical fasteners such as, for example, screws, rivets, or alternatively using an industrial strength adhesive. In the embodiment shown in FIG. 4 the housing 400 is not entirely rectangular or square in cross section since it includes a relief 432. The relief 432 provides clearance for the upper rear roller assemblies 402 so that they can be swung out of the way by the rack mechanism 408 when awaiting ejection of tape cartridges from a tape drive 148.

Each of the roller assemblies 402 and 404 are pivotally mounted onto the housing 400 adjacent an upper end of the tape cartridge slot 424. The roller assemblies 402 and 404 are pivoted by the rack mechanism 408 about pivot axes 434 and 436 in a well known manner by gears and/or pulleys. In one embodiment, the rack mechanism 408 will comprise the rack mechanism utilized in the Quantum DLT 2500XT tape cartridge storage and retrieval system. The pivot axes 434 and 436 are oriented substantially perpendicular to the plane of the tape cartridge slot 424. The direction of the pivoting motion is determined by the direction of rotation of the rack drive shaft 120 in a well known manner. In one embodiment, the roller assemblies 402 and 404 are pivoted into contact with a tape cartridge during extraction of a cartridge from a tape cartridge magazine 156 and pivoted out of the way to permit ejection of a tape cartridge from the tape drives 148.

Each of the roller assemblies 402 and 404 includes a three sided gear housing 438 defining a U-shaped channel that opens downward into the tape cartridge slot 424. Rotatably mounted within the U-shaped channel of the gear housing 438 are a plurality of roller gears 440 and idler gears 442 supported on rigid support shafts which are in turn supported by the housing 438. The roller gears 440 and idler gears 442 are oriented to rotate in a plane substantially parallel to the plane of the tape cartridge slot 424. A roller 444 is coaxially mounted onto each of the roller gears 440. Rotation of the driver gear 406 in turn causes rotation of the roller gears 440 and idler gears 442 of the roller assemblies 402 and 404. In operation, the rollers 444 contact the top surface of a tape cartridge when the roller assemblies 402 and 404 are pivoted toward the tape cartridge slot 424 and impart movement to the tape cartridge dictated by the direction of rotation of the roller gears 424. In one embodiment, the driver gear 406, roller gears 440 and idler gears 442 are fabricated from a suitable lightweight and durable material such as, for example, nylon or similar material a high strength to weight ratio. The rollers 444 are preferably fabricated from a material selected to have a relatively high coefficient of friction in contact with typical materials used for tape cartridge cases such as, for example, natural or synthetic rubber. The gear housings 438 may be fabricated from a high strength to weight ratio material and include conventional mounting and support structure for the roller gears 440 and idler gears 442.

The use of roller gears 440 permits design of the tape cartridge elevator 114 in a smaller form factor. That in turn triggers a domino effect of benefits. Since the tape cartridge elevator 114 can be produced in a smaller form factor, it is possible to reduce the overall package size of a mass storage and retrieval unit 100 that includes tape cartridge magazines 156 and tape drives 148. The reduction in overall package size permits the mass storage and retrieval unit 100 in one exemplary embodiment to include two seven cartridge tape magazines in a multi-tape-drive unit that fits into an industry standard 7 inch by 19 inch rack mount.

The tape cartridge sensors 414 and 416 are positioned within the tape cartridge slot 424 of the housing 400 and provide tape cartridge presence signals which are processed by the tape cartridge loader controller 144 and library controller 146 to thereby properly approximately centrally position the tape cartridge within the tape cartridge slot 424 for subsequent transport after retrieval.

Figure 5:
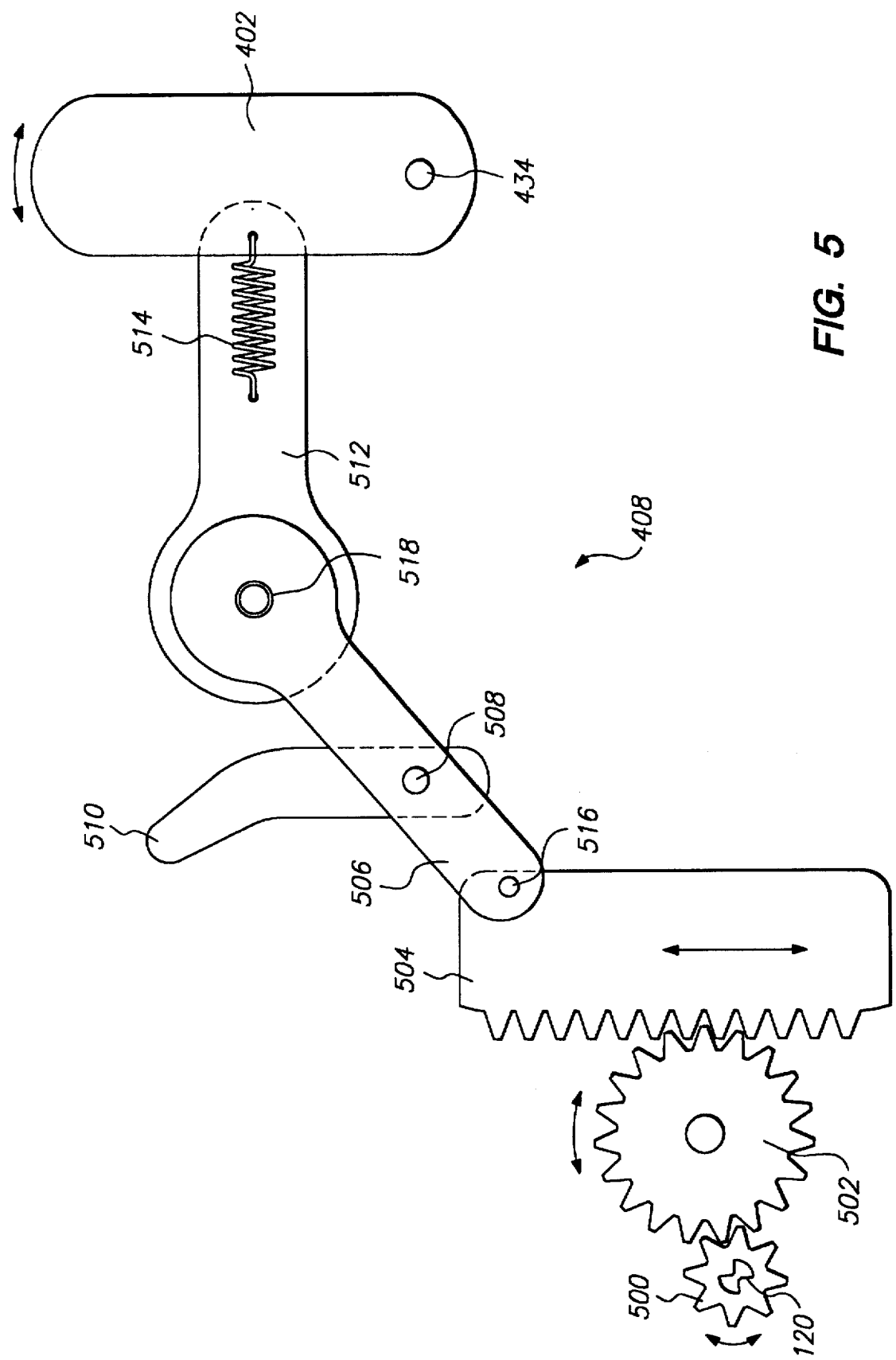
FIG. 5 is a cross section view illustrating the rack mechanism utilized by the tape cartridge elevator of the mass storage and retrieval unit.

Referring to FIG. 5, the elements of the rack mechanism 408 utilized for pivoting the roller assembly 402 are illustrated. The elements of the rack mechanism 408 utilized for pivoting the other roller assembly 404 are simply the mirror image of those illustrated. The rack mechanism 408 includes a rack drive gear 500, a transmission gear 502, a rack 504, a first link lever 506, a first link lever pin 508, a motion guiding curve 510, a second link lever 512, and a roller assembly spring 514, a first pinned connection 516, and a second pinned connection 518. During operation, bidirectional rotation of the rack drive shaft 120 causes bidirectional rotation of the transmission gear 502. Bidirectional rotation of the transmission gear 502 in turn causes the rack 504 to reciprocate linearly. As the rack 504 moves, the first link lever 506 that is pivotally attached to the rack 504 moves. Motion of the first link lever 506 is defined by the motion guiding curve 510 by means of the first link lever pin 508. Movement of the first link lever 506 causes the second link lever 512 to move. Motion of the second link lever 512 causes the roller assembly 402 to pivot about the pivot axis 434. The roller assembly 402 is spring biased into contact with the second link lever 512 by the roller arm spring 514. In one embodiment, the rack mechanism 408 is a rack mechanism substantially the same as that utilized in the Quantum DLT 2500 XT tape storage and retrieval unit.

Figure 6A:
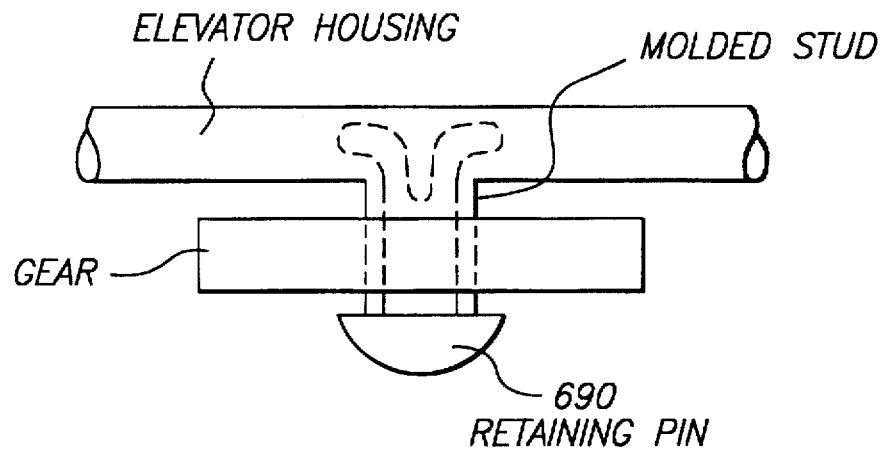
FIGS. 6A and 6B illustrate alternative mounting arrangements for mounting the transmission gears of the transmission train upon axle studs.
Figure 6B:
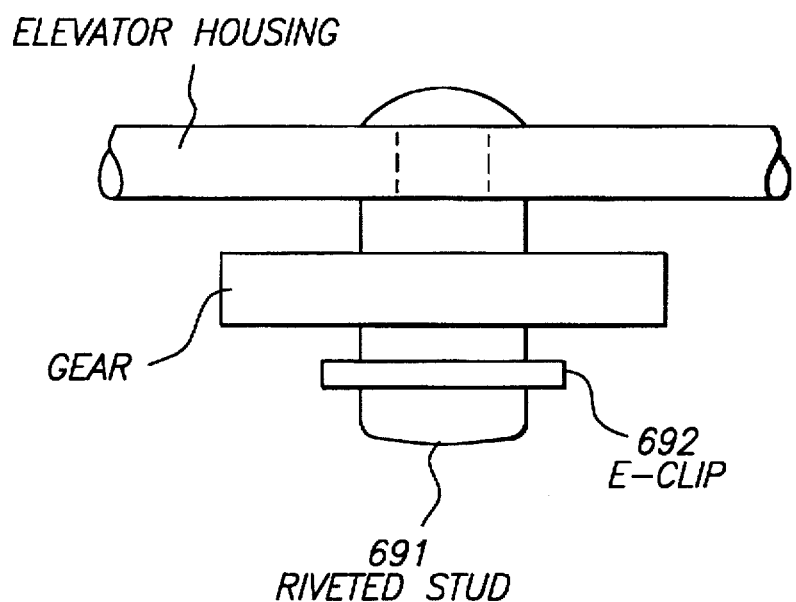

In the embodiment illustrated in FIG. 4, power or torque is transferred from the driver gear 406 to the roller gears 440 and thereby to the rubber rollers 444 via a series of idler gears 442. In an alternative embodiment, power or torque may be further transferred via a series of gears, referred to as a transmission train, to drive rollers rotatably mounted at the lower end of the housing 400. The transmission gears of the train may be mounted upon axle studs 690, 691 molded or formed in the housing 400 and mounted thereon by conventional retaining pins. FIG. 6A shows a molded stud 690, and FIG. 6B shows a riveted stud 691 and an E-clip 692 for retaining the transmission spur gear.

During operation of the mass storage and retrieval unit 100, the conventional tape cartridge release finger 412 of the tape cartridge elevator 114 engages release levers 162 positioned at the slots 158 of the tape cartridge magazines 156. In this manner, the selected tape cartridge within the slot 158 of the tape cartridge magazine 156 is released for retrieval by the tape cartridge elevator 114. Tape cartridges retrieved from the tape drives 148 are simply ejected by the tape drives 148 into the rear side of the tape cartridge slot 424.

The leaf spring 418 provides an alignment bias to a tape cartridge positioned within the tape cartridge slot 424 of the tape cartridge elevator 114. This bias reduces shifting of the tape cartridge while positioned with the tape cartridge slot 424. This provides the significant benefit of maintaining the alignment of the tape cartridge thereby improving the reliability of the tape cartridge elevator 114 in operation. This improved alignment permits the mass storage and retrieval unit 100 to be oriented as desired, even permitting the tape cartridge slot 424 of the tape cartridge elevator 114 to be vertically oriented.

The terms "upper end," "lower end", "left side," and "right side" are used throughout for convenience to describe the relative positions of the components within the tape cartridge elevator 114 and are not used to indicate any particular orientation of the tape cartridge elevator 114. For example, it will be recognized by those of ordinary skill having the of the present disclosure that the "upper end" of the tape cartridge slot 424 may actually be located at the physical lower end of the tape cartridge elevator 114, and vice versa.

The mass storage and retrieval unit 100 operates under the control of the tape cartridge loader controller 144 and the library controller 146 in two basic modes of operation. In the first mode of operation, the mass storage and retrieval unit 100 automatically loads a selected tape cartridge from one of the tape cartridge magazines 156 into a selected one of the tape drives 148. In the second mode of operation, the mass storage and retrieval unit 100 automatically unloads a tape cartridge from a selected one of the tape drives 148 into one of the tape cartridge magazines 156.

During the first mode of operation, i.e., retrieval of selected tape cartridges from tape cartridge magazines 156 and then into tape drives 148, the tape cartridge elevator 114 is first positioned adjacent to the slot 158 containing the selected tape cartridge. The roller assemblies 402 and 404 within the tape cartridge elevator 114 are pivoted upward within the tape cartridge slot 424 by the rack mechanism 408. The release finger 412 of the tape cartridge elevator 114 engages the release lever 162 of the slot 158 of the tape cartridge magazine 156 thereby releasing the selected tape cartridge for retrieval by the tape cartridge elevator 114. The roller assemblies 402 and 404 within the tape cartridge elevator 114 are activated and substantially contemporaneously the rack mechanism 408 pivots the roller assemblies 402 and 404 downward and into contact with the top surface of the selected tape. The rotating rollers 444 of the roller assemblies 402 and 404 contact the top surface of the selected tape cartridge and thereby impart motion to the selected tape cartridge and bring the selected tape cartridge into the tape cartridge slot 424 of the tape cartridge elevator 114. The tape cartridge sensors 414 and 416 positioned within the tape cartridge slot signal deactivation of the rotation of the roller assemblies 402 and 404 once the tape cartridge has been sensed to be approximately centrally positioned within the tape cartridge slot 424 of the tape cartridge elevator 114. The tape cartridge elevator 114 is then repositioned opposite the tape cartridge slot 150 of the selected tape drive 148. The roller assemblies 402 and 404 are then reactivated and thereby position the selected tape cartridge into the tape cartridge slot 150 of the selected tape drive 148. The handle of the selected tape drive 148 is then automatically closed and the tape cartridge presence sensor 152 within the selected tape drive 148 signals the tape cartridge loader controller 144 and library controller 146 that the selected tape cartridge has been loaded.

During the second mode of operation, i.e., retrieval of selected tape cartridges from tape drives 148 and into tape cartridge magazines 156, the tape cartridge elevator 114 is first positioned adjacent to the slot 150 containing the selected tape cartridge. The roller assemblies 402 and 404 within the tape cartridge elevator are pivoted in an upward direction within the tape cartridge slot 424 by activation of the rack mechanism 408. The upper rear roller assembly 402 swinging into the recess 432 of the housing 400. The tape cartridge is then ejected from the slot 150 of the tape drive 142 and into the rear side of the tape cartridge slot 424. The roller assemblies 402 and 404 within the tape cartridge elevator are activated and substantially contemporaneously the rack mechanism 408 repositions the roller assemblies 402 and 404 downward and into contact with the top surface of the selected tape cartridge. The rotating rollers 444 of the roller assemblies 402 and 404 contact the top surface of the selected tape cartridge and thereby impart motion to the selected tape cartridge and bring the selected tape cartridge into the tape cartridge slot 424 of the tape cartridge elevator 114. The tape cartridge sensors 414 and 416 positioned within the tape cartridge slot cause deactivation of rotation of the roller assemblies 402 and 404 once the tape cartridge has been sensed to be approximately centrally positioned within the tape cartridge slot 424 of the tape cartridge elevator 114. The tape cartridge elevator 114 is then repositioned opposite the tape cartridge slot 158 of the tape cartridge magazine 156. The roller assemblies 402 and 404 are then reactivated and thereby position the selected tape cartridge into the tape cartridge slot 158 of the tape cartridge magazine 156. The tape cartridge presence flag 160 within the slot 158 of the tape cartridge magazine 156 signals that the tape cartridge has been properly loaded.

In an alternative embodiment, the mass storage and retrieval unit 100 also conducts an inventory of the tape cartridges e.g. by optically scanning the tape cartridge presence flags positioned at each of the slots 158 of the tape cartridge magazines 156. In yet another alternative embodiment, the tape cartridges used in the mass storage and retrieval unit 100 are provided with standard bar code labels which permit the unit 100 to inventory the tape cartridges within the unit by optically scanning the bar code labels during retrieval by the tape cartridge elevator 114. A standard bar code reader is provided on top of the tape elevator 114. In an alternative embodiment, the standard bar code reader is mounted above the tape cartridge magazines.

In yet another alternative embodiment, the mass storage and retrieval unit 100 includes a second tape cartridge elevator oriented in a direction substantially perpendicular to the plane of the first tape cartridge elevator. This configuration permits the transport of tape cartridges above and below the plane of the first tape cartridge elevator by means of the second tape cartridge elevator. Tape cartridges are transferred from the first tape cartridge elevator to the second tape cartridge elevator thereby permitting transport of tape cartridges in three dimensions.

Figure 7:
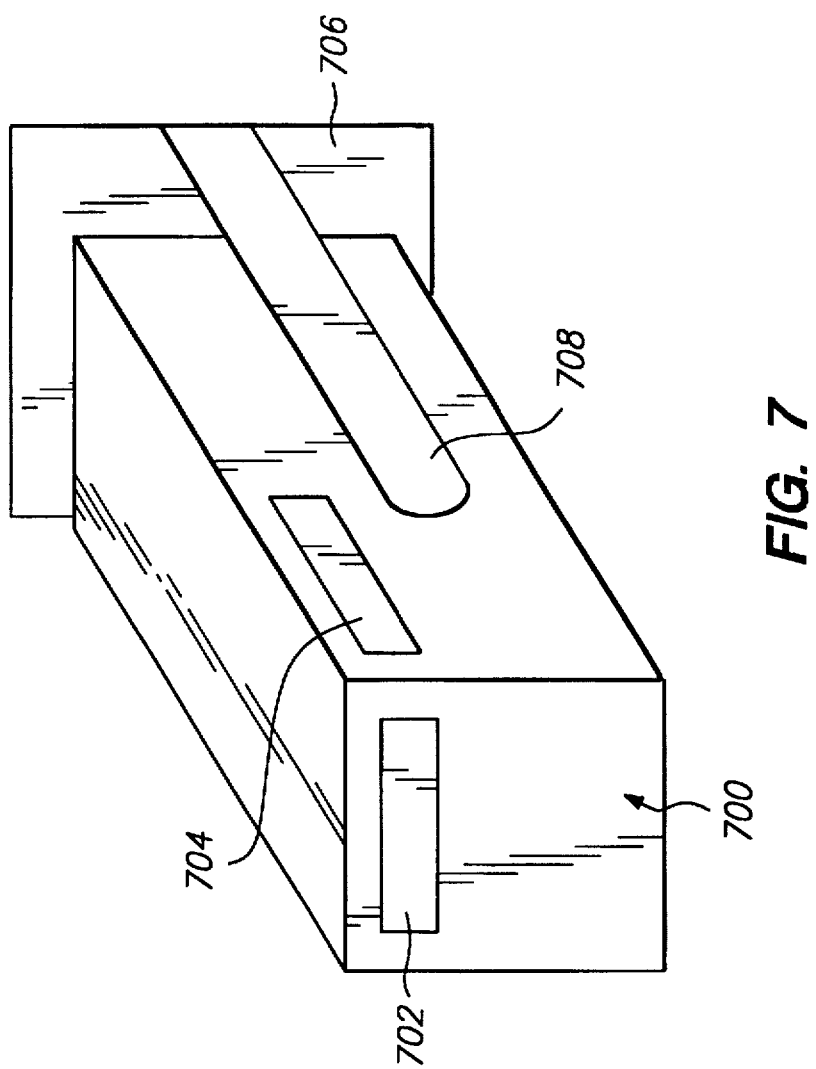
FIG. 7 is an illustration of an interunit transport unit mounted within the mass storage and retrieval unit.
Figure 8:
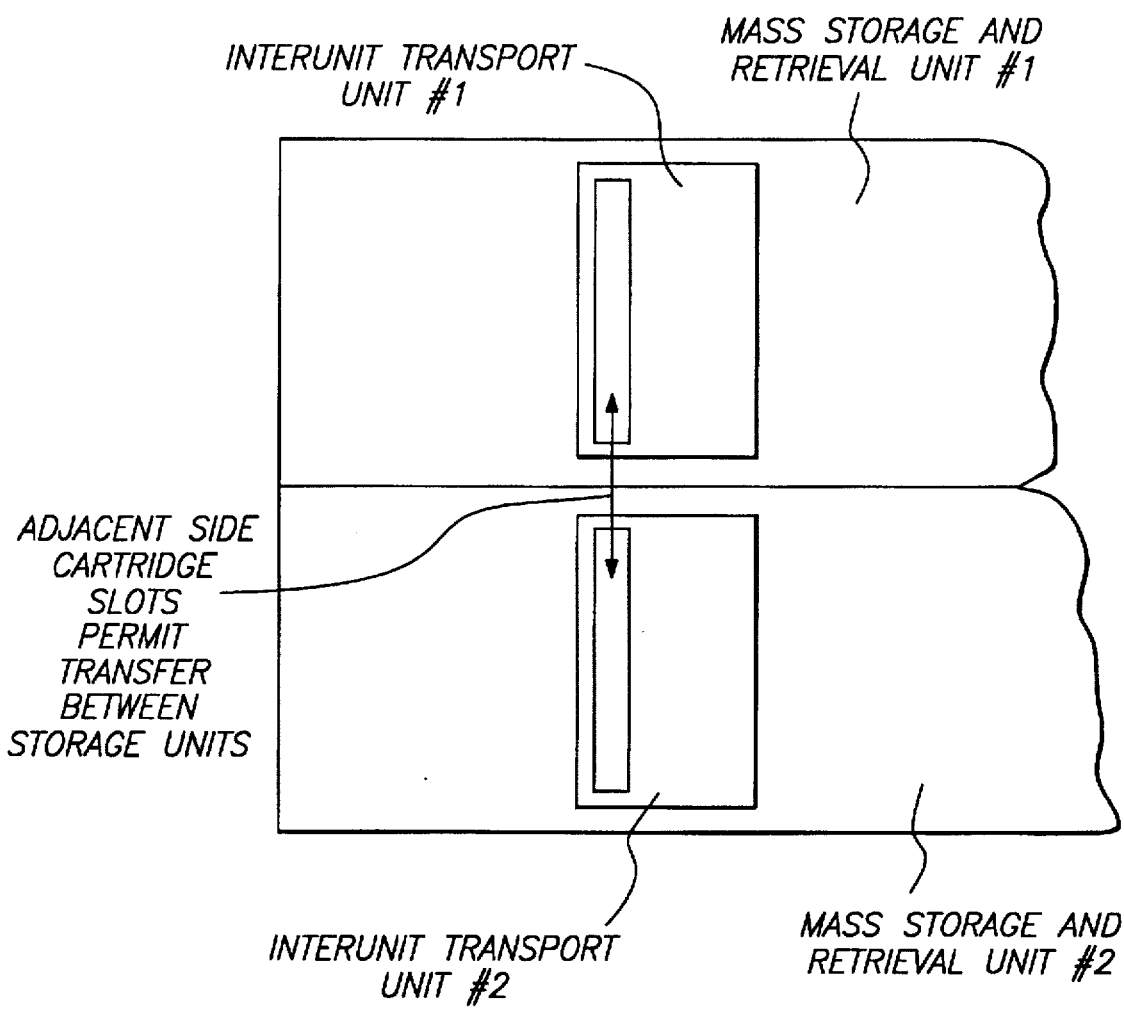
FIG. 8 is an illustration of a plurality of interunit transport units mounted within adjacent mass storage and retrieval units.

Referring to FIGS. 7 and 8, an interunit transport unit (ITU) 700 will now be described that provides the transport of tape cartridges between adjacent mass storage and retrieval units. The ITU 700 includes a front cartridge slot 702 and at least one side cartridge slot 704. The ITU 700 is e.g. secured to a rear mounting plate 706 by side mounting brackets 708. The ITU 700 receives tape cartridges into the front cartridge slot 702 and then transfers the tape cartridges out of the side tape cartridge slot 704 and vice versa. In this manner, adjacent ITUs can transfer tape cartridges between one another. The ITU 700 can be installed in place of one the tape drive units 148 in the mass storage and retrieval unit 100 using similar mounting bracket hardware. The ITU 700 includes at least two sets of roller assemblies similar to those employed in the tape cartridge elevator 114. In one embodiment, the at least two sets of roller assemblies are oriented perpendicular to one another to thereby permit a tape cartridge to be transported and received in two orthogonal directions. The two directions may of course be at orientations other than orthogonal and there may be more than two different directions for transport of the tape cartridge within the ITU 700.

As illustrated in FIG. 8, the ITU 700 permits tape cartridges to be transported from one mass storage unit 100 to an adjacent mass storage unit 100. In operation, the tape cartridge elevator 114 for a first mass storage unit 100 will load a tape cartridge into the front cartridge slot of the first ITU within the first mass storage unit 100. The first ITU will then transport the tape cartridge out of its side tape cartridge slot and into the side tape cartridge slot of the second ITU in the second mass storage unit 100. The tape cartridge elevator 114 in the second mass storage unit 100 will then receive the tape cartridge out of the second ITU from the front slot of the second ITU. In one embodiment, a pair of adjacent mass storage units with ITUs are employed. In alternative embodiments, a plurality of mass storage units, each with one or more ITUs, are employed.

A mass storage and retrieval unit has been described for automatically loading or unloading a selected one of a plurality of tape cartridges from or to one of a plurality of selected tape cartridge magazines into or from a selected one of a plurality of tape drives in response to a request from a computer. The mass storage and retrieval unit will find use in applications as diverse as data processing and video-on-demand.

An interunit transfer unit (ITU) has also been described for use in the mass storage to thereby permit the transport of tape cartridges between a plurality of mass storage and retrieval units.

While the invention is susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the appended claims.

What is claimed is:

1. A tape cartridge elevator mechanism comprising:
    an elevator housing having a plurality of sides including a left side and a right side, an elevator tape-cartridge slot, and a roller drive shaft opening in one of the sides;
    at least one roller assembly attached to the elevator housing;
    a driver gear attached to the elevator housing and having an opening substantially aligned with the roller-drive-shaft opening for receiving a roller drive shaft and being coupled to roller gears to drive the at least one roller assembly
    a rack drive opening to receive a rack drive shaft; and
    a rack mechanism attached to the elevator housing and having an opening substantially aligned with the rack-drive-shaft opening for receiving the rack drive shaft and being coupled to the at least one roller assembly to move the at least one roller assembly.

2. A tape cartridge elevator mechanism comprising:
    an elevator housing having a plurality of sides including a left side and a right side that define an elevator tape-cartridge slot with the elevator housing including a roller-draft-shaft opening;
    at least one roller assembly attached to the elevator housing and comprising:
    a three-sided gear housing defining a U-shaped channel that opens into the elevator tape-cartridge slot;
    a plurality of roller gears mounted on the gear housing within the U-shaped channel;
    a plurality of rollers respectively mounted on the roller gears and oriented to rotate in a plane substantially parallel to the plane of the elevator tape-cartridge slot; and
    a driver gear attached to the elevator housing, and coupled to the roller gears to drive the rollers, the driver gear further including an opening aligned with the roller-drive-shaft opening for receiving a roller drive shaft.

3. The tape cartridge elevator of claim 2 further comprising at least one leaf spring extending from a side of the housing into the tape-cartridge slot.

4. The tape cartridge elevator of claim 2 further comprising a release finger extendible into a magazine tape-cartridge slot to release a cartridge release lever associated with the magazine tape-cartridge slot.

5. A multi-drive, multi-magazine cartridge handling unit for automatically loading a specified tape cartridge in a magazine tape-cartridge slot in one of a plurality of tape cartridge magazines into a drive tape-cartridge slot of a selected one of a plurality of tape drives in response to a request from a computer, the multi-drive, multi-magazine cartridge handling unit including:
    a housing having one side wall adapted for receiving the plurality of tape cartridge magazines, and having another side wall adapted for receiving the plurality of tape drives,
    an elevator substantially linearly moveable between positions associated with each magazine tape-cartridge slot and each drive tape-cartridge slot and having at least one roller assembly, an elevator tape-cartridge slot, and
    cartridge movement means associated with the at least one roller assembly for engaging the specified cartridge, for moving the specified cartridge between the magazine tape-cartridge slot and the drive tape-cartridge slot via the elevator tape-cartridge slot,
    elevator control means for moving the elevator between the magazine tape-cartridge slot and the drive tape cartridge-slot and
    a plurality of magazine tape-cartridge slots within each magazine, each magazine tape-cartridge slot having an associated cartridge-present flag and a release lever, and wherein the elevator has a release finger for engageably releasing the release lever of a magazine tape-cartridge slot during a tape cartridge withdrawal operation carried out by the cartridge movement means.

6. The multi-drive, multi-magazine cartridge handling unit of claim 5 wherein the cartridge movement means includes cartridge engagement means for bringing the at least one roller assembly into contact with the specified tape cartridge.

7. The multi-drive, multi-magazine cartridge handling unit of claim 5 wherein the cartridge movement means includes elevator cartridge control means for operating the at least one roller assembly to move the specified tape cartridge into the elevator tape-cartridge slot in accordance with sensing means for sensing position of the selected cartridge within the elevator tape-cartridge slot.

8. The multi-drive, multi-magazine cartridge handling unit of claim 5 wherein the elevator control means includes elevator position control means for positioning the elevator at the magazine tape-cartridge slot incident to a cartridge withdrawal operation, and for positioning the elevator at the drive tape-cartridge slot of the selected tape drive incident to a drive tape cartridge loading operation.

9. The multi-drive, multi-magazine cartridge handling unit of claim 5 further comprising status signal means for signaling the computer that the specified tape cartridge has been loaded into an operating position of the selected tape drive.

10. The multi-drive, multi-magazine cartridge handling unit of claim 5 comprising a plurality of tape cartridges in the plurality of tape cartridge magazines, and wherein each said tape cartridge includes a cartridge identification indicia, and further comprising identification indicia reading means cooperating with the elevator so that the identification indicia of each tape cartridge may be read as the elevator moves past the tape cartridge.

11. The multi-drive, multi-magazine cartridge handling unit of claim 10 wherein the cartridge identification indicia comprises a bar code, and wherein the identification indicia reading means comprises an optical bar code reader.

12. A mass storage and retrieval unit comprising:
a housing having a left wall, a right wall, and a power supply;
a plurality of tape drive slots arranged in the housing;
a plurality of tape-cartridge magazine slots arranged in the housing;
an elevator mechanism within the housing and located between the tape-drive slots and the tape-cartridge magazine slots and including:
an elevator carriage secured to at least one guide shaft extending substantially between a left wall and a right wall of the housing;
a roller drive shaft extending substantially between the left wall and the right wall of the housing;
a rack drive shaft extending substantially between the left wall and right wall of the housing;
an elevator motor;
first motion transfer means, connected to the elevator motor, for moving the elevator carriage along the guide shaft;
a roller drive motor;
second motion transfer means, connected to the roller drive motor, for driving the roller drive shaft;
a rack drive motor; and
third motion transfer means, connected to the rack drive motor, for driving the rack drive shaft.

13. The mass storage and retrieval unit of claim 12 wherein the elevator motor comprises a stepper motor.

14. The mass storage and retrieval unit of claim 12 further comprising a loader controller slot and a library controller slot, each slot being located at the rear of the housing.

15. A mass storage and retrieval unit comprising:
a housing having a left side and a right side;
a plurality of tape-drive slots positioned in the housing;
a plurality of tape-cartridge magazine slots positioned in the housing;
an elevator, disposed within the housing between the tape-drive slots and the tape-cartridge magazine slots and positionally guided between the left wall and the right wall of the housing, the elevator including at least one cartridge roller assembly;
elevator displacement means for controllably displacing the elevator between selected ones of the tape-drive slots and the tape cartridge magazine slots;
a roller drive shaft extending substantially between the left wall and the right wall of the housing for driving the roller assembly; and
a roller drive motor having coupling means for coupling the roller drive motor to the roller drive shaft.

16. The mass storage and retrieval unit of claim 15 wherein the elevator displacement means includes an elevator motor, and motion transfer means connected between the elevator motor and the elevator for moving the elevator along the at least one guide shaft.

17. The mass storage and retrieval unit of claim 15 further comprising a cartridge tape drive within the housing having a drive tape-cartridge slot providing at least one of the tape-drive slots.

18. The mass storage and retrieval unit of claim 15 further comprising at least one tape cartridge magazine received into the housing and providing at least some of the plurality of magazine tape-cartridge slots.

19. The mass storage and retrieval unit of claim 18 wherein the at least one tape cartridge magazine has a tape cartridge flag associated with the at least some of the plurality of tape cartridge slots, a tape cartridge flag being set by loading a tape cartridge into a magazine tape-cartridge slot.

20. A mass storage and retrieval subsystem comprising at least a first and a second multi-drive, multi-magazine mass storage and retrieval units, each unit comprising:
a housing having a left side and a right side;
a plurality of tape-drive slots positioned in the housing;
a plurality of tape-cartridge magazine slots positioned in the housing;
an elevator disposed within the housing between the tape-drive slots and the tape-cartridge magazine slots and positionally guided between the left wall and the right wall of the housing; and,
elevator displacement means for controllably displacing the elevator between selected ones of the tape-drive slots and the tape cartridge magazine slots, and further comprising at least a first and a second interunit cartridge transport for transferring a cartridge between the units, the first interunit cartridge transport being located at a tape-drive slot adjacent the rear and one of said sides of the first multi-drive, multi-magazine mass storage and retrieval units, the second interunit cartridge transport being located at a tape-drive slot adjacent the rear and an opposite one of said sides of the second multi-drive, multi-magazine mass storage and retrieval units, each interunit cartridge transport comprising:
an interunit housing;
a front tape cartridge slot positioned along the front face of the interunit housing and aligned with the tape-drive slot.

a side tape cartridge slot positioned along a side face of the interunit housing; and a tape cartridge transport mechanism within the interunit housing connected to the front cartridge slot and the side tape cartridge slot, the first and a second multi-drive, multi-magazine mass storage and retrieval units being adjacently located and defining aligned openings such that tape cartridges may be passed between the first and second interunit cartridge transports via aligned openings of the aligned sides and via the side tape cartridge slots.

21. A tape cartridge storage and retrieval system, comprising:

a first cartridge tape storage and retrieval unit, said first unit including a first interunit transport unit, a second cartridge tape storage and retrieval unit, said second unit including a second interunit transport unit;

said first and second interunit transport units for transferring a cartridge between the first and second cartridge tape storage and retrieval units, each comprising:

a housing;

a front tape cartridge slot positioned along a front face of the housing;

a side tape cartridge slot positioned along a side face of the housing; and a tape cartridge transport mechanism within the housing connected to the front cartridge slot and the side tape cartridge slot for moving a tape cartridge through the unit via the front tape cartridge slot and the side tape cartridge slot in accordance with a control signal provided by the system, and a tape cartridge slot of said first interunit transport unit being operably coupled to a tape cartridge slot of said second interunit transport unit via aligned tape-cartridge slot openings defined in adjacent sidewalls of the first and second storage and retrieval units for interunit transfer of a tape cartridge.

22. A tape cartridge elevator mechanism comprising:

an elevator housing defining an elevator tape-cartridge slot;

at least one roller assembly attached to the elevator housing, the roller assembly comprising:

a three-sided gear housing defining a U-shaped channel that opens into the elevator tape-cartridge slot, a plurality of roller gears mounted on the gear housing within the U-shaped channel, a plurality of rollers respectively mounted on the roller gears;

a driver gear coupled to the roller gears to drive the roller assembly;

a rack drive opening for receiving a rack drive shaft; and a rack mechanism attached to the elevator housing and having an opening aligned with the rack drive opening for engaging the rack drive shaft and coupled to the at least one roller assembly to move the at least one roller assembly.

23. A multi-drive, multi-magazine cartridge handling unit for automatically loading a specified tape cartridge in a magazine tape-cartridge slot in one of a plurality of tape cartridge magazines into a drive tape-cartridge slot of a selected one of a plurality of tape drives in response to a request from a computer, the multi-drive, multi-magazine cartridge handling unit including:

a housing adapted for receiving the plurality of tape cartridge magazines, and the plurality of tape drives;

an elevator moveable between positions associated with each magazine tape-cartridge slot and each drive tape-cartridge slot and having at least one roller assembly, and an elevator tape-cartridge slot, the elevator also including a roller drive shaft opening; and cartridge movement means associated with the at least one roller assembly for engaging the specified cartridge, for moving the specified cartridge between the magazine tape-cartridge slot and the drive tape-cartridge slot via the elevator tape-cartridge slot;

wherein, the elevator includes a driver gear having an opening substantially aligned with the roller-drive-shaft opening to receive a roller drive shaft to drive the at least one roller assembly a rack drive opening to receive a rack drive shaft, and a rack mechanism having an opening substantially aligned with the rack-drive-shaft opening to receive the rack drive shaft and being coupled to the at least one roller assembly to move the at least one roller assembly.

24. A mass storage and retrieval unit comprising:

a housing having a left side and a right side;

a plurality of tape-drive slots positioned in the housing;

a plurality of tape-cartridge magazine slots positioned in the housing;

an elevator disposed within the housing between the tape-drive slots and the tape-cartridge magazine slots and positionally guided within the housing, the elevator including a roller assembly; and, elevator displacement means for controllably displacing the elevator between selected ones of the tape-drive slots and the tape cartridge magazine slots;

a rack drive shaft extending substantially between the left wall and right wall of the housing for moving the roller assembly;

a rack drive motor; and a rack coupling means for coupling the rack drive motor to the rack drive shaft.

* * * * *